Figure 1:
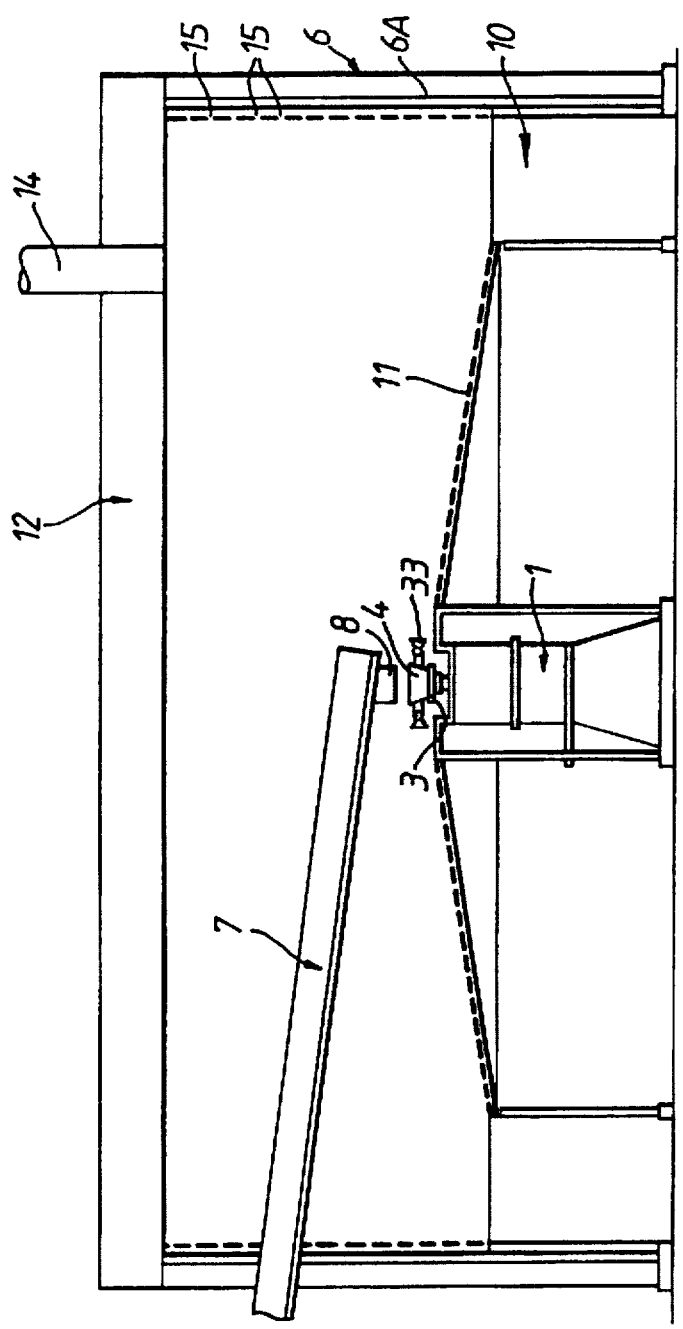
Figure 2:
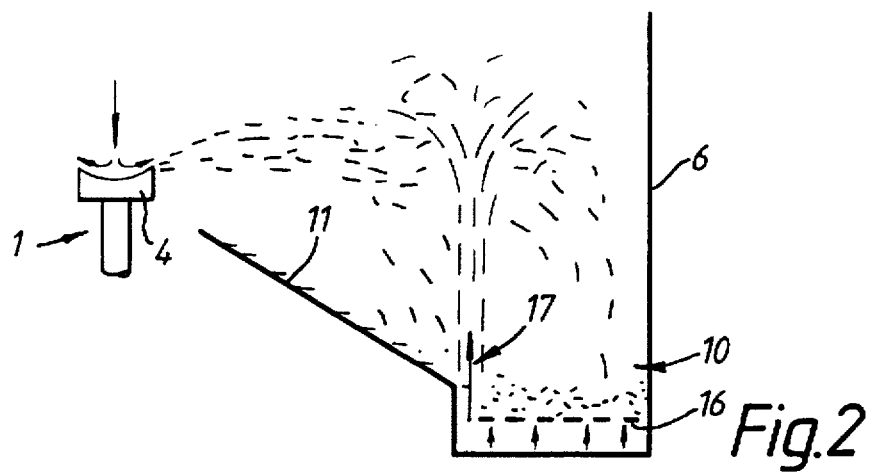
Figure 3:
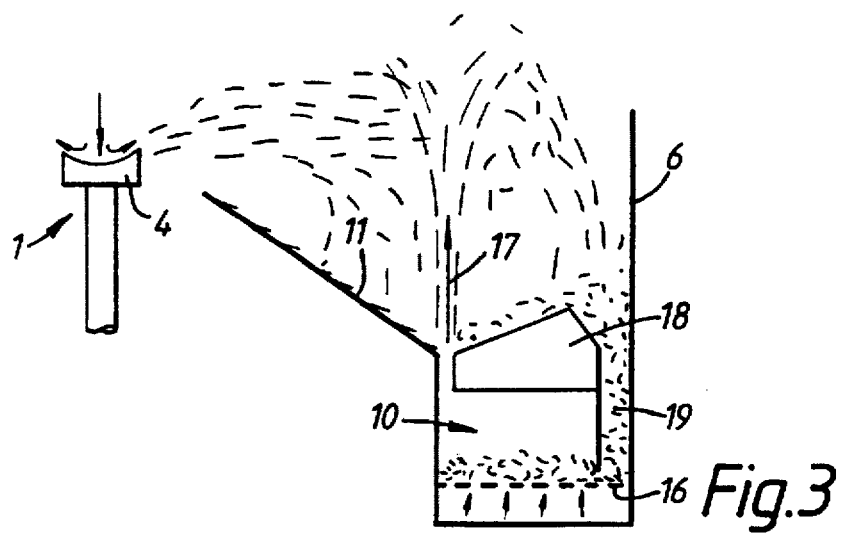
Figure 4:
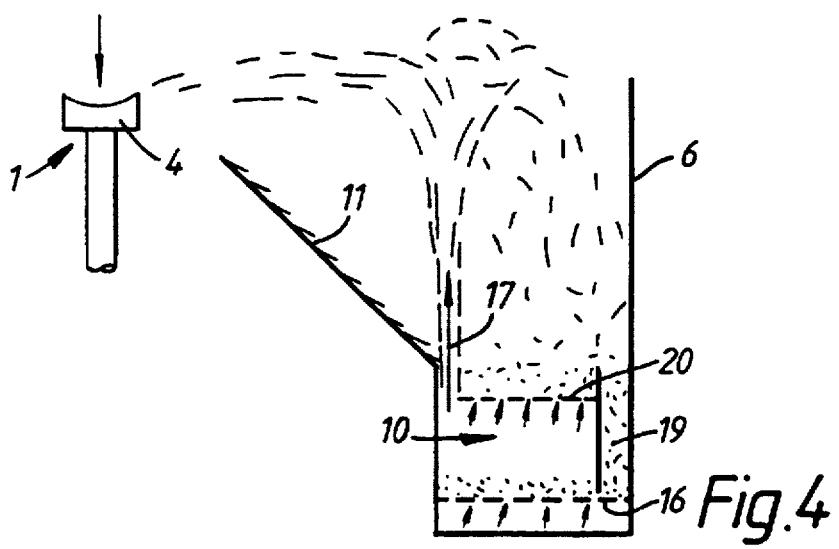

United States Patent [19]
Featherstone

[11] Patent Number: 5,735,931
[45] Date of Patent: Apr. 7, 1998

[54] SLAG GRANULATION METHOD AND APPARATUS

[75] Inventor: William Barry Featherstone, Cleveland, United Kingdom

[73] Assignee: Davy McKee (Stockton) Limited, England

[21] Appl. No.: 596,334

[22] PCT Filed: Aug. 11, 1994

[86] PCT No.: PCT/GB94/01766
§ 371 Date: Mar. 25, 1996
§ 102(e) Date: Mar. 25, 1996

[87] PCT Pub. No.: WO95/05485
PCT Pub. Date: Feb. 23, 1995

[30] Foreign Application Priority Data

Aug. 12, 1993 [GB] United Kingdom .................. 9316767

[51] Int. Cl.⁶ ..................................................... C21B 3/08
[52] U.S. Cl. ........................................ 75/334; 65/19; 425/8
[58] Field of Search ........................ 65/19; 425/8; 75/334

[56] References Cited

U.S. PATENT DOCUMENTS 5,409,521  4/1995  Featherstone et al. .................. 75/333

FOREIGN PATENT DOCUMENTS

93/06250  4/1993  WIPO .................................... 75/333

Primary Examiner—Melvyn Andrews
Attorney, Agent, or Firm—Lee, Mann, Smith, McWilliams, Sweeney & Ohlson

[57] ABSTRACT

A granulator comprises a rotary atomizer on to which the molten material to be granulated is poured in a stream. The rotation of the atomizer causes the molten material to be ejected therefrom in the form of globules. No fluid jets are used to break up the molten material. The globules pass through an enclosure and partially freeze to form granules which are collected in an annular trough. A gas is injected into the trough to induce a circumferential movement of the granules within the trough towards at least one exit from the trough.

20 Claims, 3 Drawing Sheets

SLAG GRANULATION METHOD AND APPARATUS

This invention relates to a method of, and apparatus for, granulating a molten material. The material may be a metal, such as iron; a metal oxide, such as titanium oxide; a non-metal, such as slag generated as a by-product of a metals production process; or a mixture thereof.

The invention is particularly applicable to the granulation of slag tapped from an iron blast furnace. The granulated slag can be used as a Portland cement substitute in the manufacture of concrete.

In our co-pending International Publication No. WO93/06250 we have described a granulator comprising an enclosure, a rotary atomiser disposed within the enclosure, and means for delivering molten material to the atomiser so that, in use, the material is broken into globules without the use of fluid jets. The globules are dispersed within the enclosure where they are at least partially frozen to form granules which are collected in an annular open-topped trough surrounding the atomiser.

The path taken by the globules from the atomiser to the open-topped trough is necessarily rather long so that the globules have time to partially freeze and form granules and so the distance from the atomiser to the outside of the open-topped trough is correspondingly long. This means that a relatively large enclosure is required to house the atomiser and the open-topped trough.

It is an object of the present invention to provide such apparatus but which is more compact than that described in the International application.

According to a first aspect of the present invention a granulator comprises an enclosure, a rotary atomiser disposed within the enclosure, means for delivering molten material to the atomiser so that, in use, the material is broken into globules without the use of fluid jets and the globules are dispersed within the enclosure;

means providing an annular gaseous curtain with entrained granules around the atomiser and through which the greater part of the globules pass and partially freeze to form granules and an open-topped trough in which the granules are collected and from which they are removed to the exterior of the enclosure.

According to a second aspect of the present invention in a method of granulating a molten material, a stream of the molten material is delivered to a rotating atomiser disposed within an enclosure; the speed of rotation of the atomiser is such that the molten material is ejected from the atomiser in the form of globules without the use of fluid jets, an annular gaseous curtain with entrained granules is provided around the atomiser such that the greater part of the quantity of globules ejected from the atomiser pass through the curtain which accelerates the cooling of the globules helping them to partially freeze to form granules and reduces the kinetic energy of the granules, the granules being collected in an open-topped trough from which they are removed to the exterior of the enclosure.

In use, the majority of the globules dispersed within the enclosure pass through the gaseous curtain with the entrained granules and this curtain reduces the temperature of the globules causing them to become partially frozen granules and it also reduces the kinetic energy of the granules causing the length of their flight path to be reduced. The reduction in energy of the granules allows the annular trough to be positioned closer to the atomiser than is the case where the annular gaseous curtain with entrained granules is not provided. This has the advantage that the dimensions of the enclosure can be reduced with a subsequent reduction in cost of the granulator.

The gas which is used to form the curtain is usually air and this may already have been passed through the granules previously collected in the annular trough and the already heated air is further heated by the passage of the globules therethrough raising the temperature of the air to a temperature high enough for this air exiting from the enclosure to be used, for example, for steam raising.

The air curtain may be formed at the side of the trough adjacent the atomiser and a proportion of the granules in the trough are caught up with the air jets so as to be entrained therewith and these granules along with the partially frozen globules from the atomiser fall back into the trough and from which they are eventually removed.

In one embodiment of the invention the partially frozen granules which penetrate the gaseous curtain fall on to a diverter above the annular trough and some of the granules are entrained in the air curtain while others flow down a plurality of stand pipes to a fluidised bed or a fluidised or other bed having circumferential movement in the trough beneath the diverter.

In another embodiment of the invention the trough contains upper and lower beds and the partially frozen granules which penetrate through the air curtain are deposited in the upper bed from which a proportion of them will be entrained in the air curtain and others pass through a plurality of stand pipes to the lower bed from which they are eventually removed.

Alternatively the annular gaseous curtain may be positioned outside of the annular trough. This means that the granules passing through the curtain are slowed down and land outside of the curtain. The granules then have to return in the direction towards the atomiser and are collected in the trough.

Thus in a further embodiment of the invention, an annular cooling bed is provided in the enclosure outside of and at a higher level than the open topped trough. A surface is inclined downwardly from the annular cooling bed to the trough. The granules passing through the curtain fall onto the cooling bed and build up the depth of the bed. As the depth increases, granules will fall down the inclined surface into the trough. The annular cooling bed is conveniently positioned adjacent the outer wall of the enclosure so that the distance between the atomiser and the outer wall is reduced thereby reducing the overall size of the granulator.

A rotary atomiser conveniently comprises a thick disc of refractory material having a shaped top surface or a cooled dish of stainless steel or other metal which promotes the desired slag globule trajectories. The top surface may be dished to a greater or lesser extent depending upon desired trajectory, slag flow rate, cup speed range specification and desired granule size. The device is rotated about a vertical axis by means of an electric or hydraulic motor. The speed of rotation of the device is controlled as a function of slag flow rate, higher flows requiring higher rotational speed to maintain globule trajectory and size distribution. For this reason, the motor is a variable speed motor.

Figure 5:
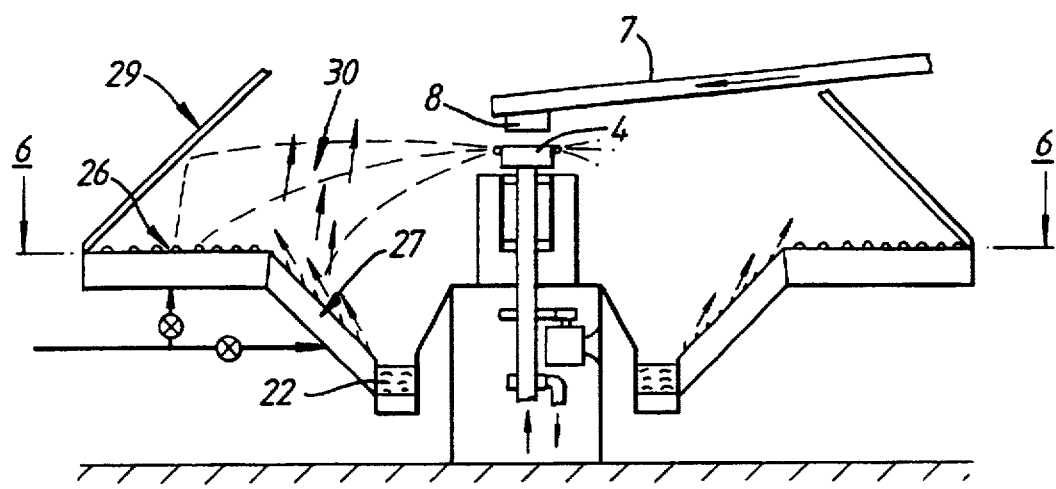
Figure 6:
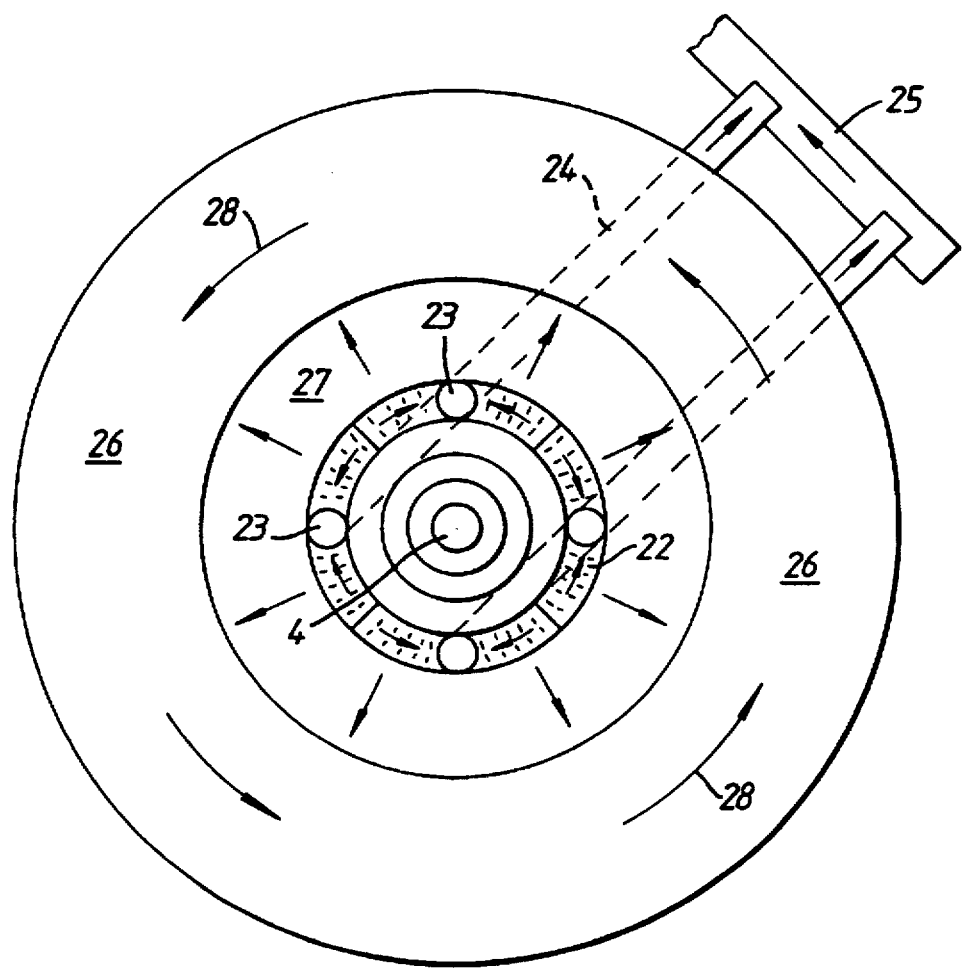

The globules of molten material ejected from the rotating atomiser fly outwardly towards the surrounding walls of the enclosure. The paths taken by the globules depend to a certain extent on the size of the globules. The globules spread out in the vertical plane as well as in the horizontal plane. The globules thus become in contact with the air in the enclosure and heat transfer between the globules and the air during the movement of the globules causes the globules to at least partially solidify to form granules. It is arranged that most of the granules will pass through the gaseous curtain with the entrained granules in it, thus slowing down the movement of the granules from the atomiser. Most of the granules will then fall directly into either the annular trough or the annular bed although others will first impinge against the side wall of the enclosure before falling into the trough or bed. However, as the speed of the globules from the atomiser is reduced by impact with the entrained granules in the gaseous curtain, the size of the enclosure can be reduced making it more compact and, therefore, of lower cost.

It is desirable for the side wall of the enclosure to include a part which is at a higher level than the top of the trough or the top of the annular cooling bed, said higher part being of annular form with the lower end thereof leading to the top of the trough or bed. This part of the side wall is conveniently liquid cooled. Alternatively, the part of the side wall may have downwardly directed openings therein and means are provided for directing cooling gas through the openings into the enclosure. The cooled wall or the air directed through the openings in the wall serve to prevent granules sticking to the wall and the granules leave the wall and fall into the trough.

Some of the globules/granules ejected from the atomiser will fall short of the trough. Preferably, an inclined surface extends downwardly from the rotary atomiser to the adjacent top edge of the trough. This surface conveniently has openings it is and gas is directed through the openings. The gas and the inclined surface encourage the granules deposited on the surface to move to the trough where most of them will be caught up by the gaseous curtain.

In order that the invention may be more readily understood, it will now be described, by way of example only, with reference to the accompanying drawings, in which:

FIG. 1 is a sectional elevation through a granulator in accordance with one embodiment of the invention;

FIGS. 2, 3 and 4 are each a diagrammatic sectional elevation through part of the apparatus of FIG. 1 showing alternative embodiments of the invention;

FIG. 5 is a sectional elevation of apparatus in accordance with a still further embodiment of the invention and FIG. 6 is a plan of the apparatus shown in FIG. 5 on the line 6—6 of FIG. 5.

Referring to FIG. 1, the rotary atomiser 1 comprises a stationary variable speed motor having a vertical drive shaft. Mounted on the drive shaft is a flange 3 supporting an atomiser dish or cup 4. The dish or cup has an upwardly facing concave surface and it is rotated about a vertical axis. The speed of rotation of the dish or cup can be varied. The atomiser is located within a generally cylindrical enclosure 6 and a feed trough or runner 7 extends from outside the enclosure to a position above the atomiser 1. An outlet nozzle 8 permits molten material flowing down the trough or runner 7 to fall as a stream on to the concave surface of the cup 4. Surrounding the atomiser 1 there is an annular trough 10 and the top of the trough is at a lower level than the cup 4. A frusto-conical surface 11 extends downwardly from the rotary atomiser to the adjacent top edge of the trough. The part 6A of the side wall, which is at a higher level than the top of the trough, has its lower end leading to the top of the trough. The enclosure is covered by a top structure 12 through which extends at least one discharge pipe 14. The part 6A of the side wall of the enclosure may have a water jacket mounted on the outside thereof with provision for cooling liquid to be circulated through the jacket in order to cool the wall. However, in the arrangement shown, this part of the side wall has downwardly directed openings 15 therethrough and a hollow casing behind the wall enables a cooling gas, usually air, to be directed through the openings into the enclosure. The flow of air is downwardly towards the trough 10. Similarly, the frusto-conical surface 11 has openings therethrough and a casing below the surface enables gas, usually air, to be directed through the openings to the upper side of the surface. The direction of the air flow through the openings is towards the trough 10. Within the trough 10, means are provided to produce a mobile bed of granules.

In the embodiment, shown in FIG. 2, a bed of granules is supported on a distributor 16 adjacent the base of the trough 10 and air under pressure is directed to the distributor in order to cause a circumferential movement of the granules within the trough. At the side of the trough 10 which is adjacent to the atomiser 1, means are provided for producing a vertically extending substantially annular air curtain 17. This curtain entrains granules from the bed with it so that the curtain with the granules entrained in it forms an obstacle to many of the globules which are passed outwardly from the rotating cup 4. This curtain slows down the globules as well as cooling them so that they are at least partially frozen and of reduced kinetic energy. The granules entrained with the air curtain and the granules from the rotating cup fall back into the bed in the trough 10. Granules which land on the surface 11 slide down into the trough.

Referring now to FIG. 3, there is a diverter 18 provided at the open top of the trough 10. The air curtain 17 is formed at the side of the diverter 18 and the granules from the atomiser are slowed in flight by collision with the curtain of air having the solidified slag entrained with it and the falling granules are separated by the diverter so that some of them are caught up with the air curtain 17 to be entrained into the curtain while others fall through one or more stand pipes 19 onto the bed supported on the distributor 16.

In the arrangement shown in FIG. 4 the annular trough 10 contains a lower bed on the distributor 16 and an upper bed supported on a second distributor 20. The air curtain 17 is formed adjacent the upper bed and granules from this bed are entrained with the air curtain. When the height of bed on the distributor 20 reaches a certain level, further granules flow down one or more stand pipes 19 to the lower bed from where the granules are continuously removed.

In the embodiments of the invention shown in FIGS. 2 and 3, the bed supported on the distributor 16 is kept at a temperature suitable for discharge and the granules are continuously removed from this bed. The granules, supported on the diverter 18 in the case of the embodiment of FIG. 3 and in the upper bed of the arrangement of FIG. 4, are kept at a significantly higher temperature. In this way, the temperature of the air in the enclosure is such that the air, on being removed from the enclosure, can be used for steam raising or other process steps.

The beds in the trough 10 may be fluidised but, conveniently, they are mobile beds moving around the trough.

The air curtain 17 is shown as being located at the side of the trough adjacent the atomiser, but the air curtain may be located outwardly from this side of the trough so that only the granules which would not fall into the trough pass through the curtain to reduce their kinetic energy and thereby cause them to fall into the trough. If the air curtain 17 is located adjacent to the side wall 6, the holes in the wall, which are an alternative to liquid cooling, are directed upwardly so that the air issuing from the holes does not oppose the motion of the curtain.

The embodiment of the invention shown in FIGS. 5 and 6 allows the enclosure to be reduced in size still further by reducing the kinetic energy of the globules/granules produced by the atomiser. As shown in FIGS. 5 and 6 the atomiser, which has a water cooled cup 4, is located centrally of the enclosure and surrounding and close to the atomiser is an open-topped trough 22. Stand-pipes 23 project upwardly through the base of the trough and the base is in sections with each section inclined downwardly towards the nearest stand-pipe. The lower ends of the stand-pipes are above conveyors 24 which extend beneath the enclosure to a common conveyor 25 which is also outside of the enclosure.

Surrounding the trough 22 and at a higher level then the trough is an annular cooling bed 26 and the inner edge of the cooling bed 26 and the outer edge of the trough are connected by an inclined surface 27. The surface 27 is apertured with the apertures being inclined upwardly towards the cooling bed. The cooling bed has apertures in its base and these apertures are inclined to the base so that air directed through the apertures causes granules of the material supported on the bed to move in one circumferential direction as indicated by arrows 28. Thus the annular cooling bed comprises a circumferentially mobile bed. The cooling bed 26 can slope gently downwardly radially towards the atomiser so that granules tend to move inwardly towards the inclined surface 27. The bed is located adjacent a side wall of the enclosure and above the bed the wall 29 of the enclosure is inclined sharply towards the atomiser.

In use, air under pressure is directed through the apertures in the inclined surface 27 and it forms an air curtain 30 located between the trough and the cooling bed 26. The air curtain sweeps up the inclined surface 27 and into the space between the cooling bed 26 and the atomiser 4. Granules which have previously been formed are caught up with the air curtain. Globules of molten material are dispersed from the atomiser and most of the globules pass through the air curtain on their flight path. The curtain serves to accelerate the cooling of the globules to form granules and the existence of the granules previously swept up into the air curtain bring about collisions with many of the newly formed granules thereby reducing their kinetic energy. The length of the flight path of these granules is reduced and most of the granules fall onto the bed 26. Others will fall on the surface 27 and some will impinge on the enclosure wall 29 before dropping onto the bed 26. Some of those granules which fall onto the surface 27 will move down into the trough 22 whereas others will be swept up the surface onto the bed 26. At the same time, the height of the bed 26 will be increased as more granules are added to it and many granules will move down the surface 27 into the trough 22. The granules in the trough are moved continuously to one or other of the stand-pipe 23 through which they exit the enclosure onto the conveyors 24 and 25.

A small quantity of globules leaving the atomiser cup will fall directly into the trough. This is due to the globules not attaining the required horizontal component of velocity as they leave the cup and is undesirable. This can largely be avoided by controlling the speed of rotation of the atomiser cup in response to the flow rate of the molten material. An increase in flow rate brings about an increase in speed.

The hot air generated in the enclosure passes out of the enclosure through the or each discharge pipe. To control the solidification of the globules in the event of a surge in flow of molten material above the designed flow rate, and to prevent globules sticking to the enclosure wall and to each other in the bed, at least one system comprising a pipe with a plurality of nozzles 33 (see FIG. 1) is located in the enclosure, conveniently adjacent to the cup 4. Water is circulated through the nozzles in the form of a very fine mist. The mist is evaporated in the vicinity of the atomiser by the heat present in the globules to reduce the globule temperature and consequently the air temperature. A control circuit may be used to vary the quantity of liquid issued as a mist in accordance with the detected temperature within the enclosure.

If heat recovery is required, the annular depression formed by the annular trough, the surface 27, and the atomiser structure, may be allowed to fill with granules. By redistributing and reducing the air to the enclosure, granules may be discharged from the trough at the same temperature as before whilst the resultand air temperature may be increased to a level suitable for heat recovery or steam raising.

I claim:

1. A granulator comprising an enclosure (6,29);

a rotary atomiser (1) disposed within the enclosure;

means (7) for delivering molten material to the atomiser (1) so that, in use, the material is broken into globules without the use of fluid jets and the globules are dispersed with the enclosure and partially frozen to form granules;

an open-topped trough (10, 22) in which the granules are collected and from which they are removed to the exterior of the enclosure; and means for upwardly projecting an annular curtain (17, 30) of gas with entrained granules around the atomiser such that the majority of the globules pass through the curtain to reduce their temperature and to reduce the kinetic energy of the granules so formed.

2. A granulator as claimed in claim 1 in which the open-topped trough is of annular form and surrounds the rotary atomiser and said means provide the gaseous curtain between the atomiser and the open-topped trough.

3. A granulator as claimed in claim 1 in which the open-topped trough is of annular form and surrounds the rotary atomiser and said means provide the gaseous curtain at the side of the open-topped trough which is away from the atomiser.

4. A granulator as claimed in claim 2 in which a surface extends downwardly from the atomiser to the trough and said means provides the gaseous curtain at a region adjacent the junction of the surface and the trough.

5. A granulator as claimed in claim 4 in which said surface has openings therein and means for directing gas through the openings towards the lower end of the surface.

6. A granulator as claimed in claim 4 in which means are provided in the trough to form either a fluidised bed of granules therein or a circumferential movement of a bed of granules in the trough.

7. A granulator as claimed in claim 4 in which exit from the trough is provided by a conduit extending through the base of the trough.

8. A granulator as claimed in claim 6 in which there is a distributor in the trough above the base of the trough and granules collected on the distributor are transferred to the bed in the base of the trough.

9. A granulator as claimed in claim 3 in which an annular cooling bed is provided in the enclosure outside of and at a higher level than the open-topped trough and a surface is inclined downwardly from the cooling bed to the trough.

10. A granulator as claimed in claim 9 in which said downwardly inclined surface is apertured and means are provided for passing gas through said apertures to form said curtain.

11. A granulator claimed in claim 9 in which said annular cooling bed is located within the enclosure adjacent an outer wall thereof, said outer wall being inclined inwardly towards said atomiser.

12. A granulator as claimed in claim 1 including means for introducing a water mist into the enclosure to remove heat therefrom by evaporation.

13. A method of granulating a molten material comprising the steps of delivering a stream of the molten material to a rotating atomiser disposed within an enclosure;

adjusting the speed rotation of the atomiser such that without the use of fluid jets the molten material is ejected from the atomiser in the form of globules;

providing an upwardly extending annular curtain of gas with entrained granules of frozen globules of the material, said curtain surrounding the atomiser, whereby the majority of the globules ejected from the atomiser pass through the curtain of gas to reduce their temperature and to reduce the kinetic energy of the granules so formed;

collecting the granules in an open-topped trough and removing the granules from the trough to the exterior of the enclosure.

14. A method as claimed in claim 13 in which the annular gaseous curtain is provided between the atomiser and the open-topped trough.

15. A method as claimed in claim 13 in which substantially all the globules passing through the curtain land in an annular cooling bed arranged outside of and at a higher level than the open-tapped trough and granules move from the annular cooling bed to the trough.

16. A method as claimed in claim 15 in which the granules of the annular cooling bed move circumferentially on the bed and granules are continuously moving down an inclined surface from the cooling bed to the trough.

17. A method as claimed in claim 16 in which some of the granules moving from the annular cooling bed to the trough are entrained in the gaseous curtain.

18. A method as claimed in claim 13 in which the granules in the trough are moved circumferentially towards the or each exit from the trough.

19. A method as claimed in claim 13 in which excessive temperature within the enclosure is controlled by injecting water mist into the enclosure to remove heat therefrom by evaporation of the water mist.

20. A method as claimed in claim 13 in which gas at elevated temperature is withdrawn from the enclosure and heat is recovered from the gas.

* * * * *